US012713274B2

(12) United States Patent
Kim et al.

(10) Patent No.: US 12,713,274 B2
(45) Date of Patent: Aug. 18, 2026

(54) SYSTEM AND A METHOD FOR ESTABLISHING COMMUNICATIONS IN A 5G OPEN RADIO NETWORK (O-RAN)

(71) Applicant: Boost SubscriberCo L.L.C., Englewood, CO (US)

(72) Inventors: Daejoong Kim, Seoul (KR); Zeev Vladimir Render, Ashburn, VA (US); Siddhartha Chenumolu, Ashburn, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 301 days.

(21) Appl. No.: 18/589,294

(22) Filed: Feb. 27, 2024

(65) Prior Publication Data

US 2025/0274803 A1 Aug. 28, 2025

(51) Int. Cl.

*H04W 28/02* (2009.01)
*H04W 48/16* (2009.01)
*H04W 76/10* (2018.01)

(52) U.S. Cl.

CPC ....... *H04W 28/0215* (2013.01); *H04W 48/16* (2013.01); *H04W 76/10* (2018.02)

(58) Field of Classification Search

CPC . H04W 28/0215; H04W 48/16; H04W 76/10; H04W 24/02; H04W 40/24; H04W 76/11; H04W 88/085; H04W 88/18; H04L 45/02; H04L 61/5014

See application file for complete search history.

(56) References Cited

U.S. PATENT DOCUMENTS

| | | | | |
|---|---|---|---|---|
| 8,996,697 | B2 * | 3/2015 | Pugh | H04L 63/1483 713/168 |
| 10,404,654 | B1 * | 9/2019 | Velusamy | H04L 61/4511 |
| 10,474,836 | B1 * | 11/2019 | Cieslak | H04L 63/083 |
| 10,791,507 | B1 * | 9/2020 | Mukherjee | H04W 4/029 |
| 11,632,312 | B2 | 4/2023 | Suthar et al. | |
| 11,870,768 | B1 * | 1/2024 | Vishwakarma | H04W 8/26 |
| 11,895,020 | B1 * | 2/2024 | Arham | H04L 45/28 |
| 2013/0028139 | A1 * | 1/2013 | Sanneck | H04L 41/0803 370/254 |
| 2018/0287873 | A1 * | 10/2018 | Peng | H04L 41/0806 |

(Continued)

FOREIGN PATENT DOCUMENTS

JP 6984827 B2 * 12/2021 ........ H04W 36/1446

*Primary Examiner* — Wutchung Chu

(74) *Attorney, Agent, or Firm* — Lowenstein Sandler LLP

(57) ABSTRACT

A method for establishing communications between a device and a 5G Open Radio Access Network (O-RAN) includes receiving, at an element management system (EMS) from the device, a connection request including capability information pertaining to the device, transmitting, to a dynamic host configuration protocol (DHCP) server associated with the device, a request for an Internet Protocol (IP) address associated with the device, receiving, from the DHCP server in response to the request, an IP address of a cell site router (CSR) deployed between the device and the DHCP server, assigning, based at least in part on the capability information pertaining to the device, (i) one or more identifiers and (ii) a virtual distribution unit (vDU) associated with the 5G O-RAN, and transmitting, from the EMS to the device, an IP address of the vDU for the device to establish connection with the network.

20 Claims, 5 Drawing Sheets

(56) References Cited

U.S. PATENT DOCUMENTS

2019/0245740 A1* 8/2019 Kachhla ................ H04L 41/045
2020/0044917 A1* 2/2020 Peng ................... H04L 41/0803
2020/0120725 A1* 4/2020 Mildh ................... H04W 76/12
2020/0145309 A1* 5/2020 Soderlund ............... H04L 45/20
2020/0162348 A1* 5/2020 Suthar ................. H04L 41/5054
2021/0303168 A1* 9/2021 Potluri .................. G06F 3/0604
2022/0279535 A1* 9/2022 Tsui .................... H04L 25/0222
2022/0286841 A1* 9/2022 Mildh ..................... H04W 8/26
2022/0286910 A1* 9/2022 Ramakrishnan ...... H04W 48/16
2024/0121655 A1* 4/2024 Huang .............. H04W 28/0268

* cited by examiner 100
vCU
135
vDU
120
Network
130
CSR
110
RU
113
RU
112
RU
111
RU
116
RU
115
RU
114

200
RU 111
CSR 110
DHCP Server 140
EMS 150
DB 160
Power On S201
DHCP Discovery S202
DHCP Discovery S203
DHCP Offer S204
DHCP Offer S205
DHCP Request S206
DHCP Request S207
DHCP Ack S208
DHCPAck S209
Call Home S210
RU IP Address Query S211
CSR IP Address S212
Associating RU to to a Cell ID, a PCID, and a vDU S213
Save the configuration S214
vDU’s IP address S215

FIG. 4

SYSTEM AND A METHOD FOR ESTABLISHING COMMUNICATIONS IN A 5G OPEN RADIO NETWORK (O-RAN)

TECHNICAL FIELD

The present disclosure relates to a system for establishing communication in an open radio network (O-RAN), and more particularly, a method of establishing communications between a device and a virtual distribution unit (vDU) in the O-RAN.

BACKGROUND

Network operators for 5G Open Radio Access Networks (O-RANs) often build their radio access network (RAN) by deploying various physical network elements such as radio units (RU), distributed units (DU), and centralized units (CU) in various geographical locations and by connecting them over Internet Protocol (IP) networks. For large and complex RANs, logical associations among network elements are first built in a database, and then the corresponding physical network elements are deployed and instantiated.

SUMMARY

The present disclosure is directed to establishing communications between a radio unit (RU) and a virtual distribution unit (vDU) in an open radio access network (O-RAN).

According to one aspect of the subject matter described in this application, a method for establishing communications between a device and a 5G Open Radio Access Network (O-RAN) can include receiving, at an element management system (EMS) from the device, a connection request for the device to establish communication with the network, the connection request including capability information pertaining to the device, transmitting, by the EMS to a dynamic host configuration protocol (DHCP) server associated with the device, a request for an Internet Protocol (IP) address associated with the device, receiving, at the EMS from the DHCP server in response to the request, an IP address of a cell site router (CSR) deployed between the device and the DHCP server such that communications between the device and the DHCP server are routed through the CSR, assigning, by the EMS based at least in part on the capability information pertaining to the device, (i) one or more identifiers and (ii) a virtual distribution unit (vDU) associated with the 5G O-RAN, updating, by the EMS, a database to link the device with the one or more identifiers, the IP address of the CSR, and the vDU that can support the device, the database storing information representing connections among network entities of the 5G O-RAN, and transmitting, from the EMS to the device, an IP address of the vDU for the device to establish connection with the network.

Implementations according to this aspect can include one or more of the following features. For example, the one or more identifiers can include a cell identifier (cell ID) and a physical cell identifier (PCID), the cell ID being a specific identifier assigned to a cell in a remote site, and the PCID being a specific identifier indicating a physical layer identity of the cell.

In some implementations, the capability information can identify a carrier component supported by the device, and updating the database can include assigning the cell ID to a cell of the device based on the capability information. In some examples, one or more carrier components can be assigned with one or more cell IDs, and each cell ID can be assigned with a PCID, an IP address of a device, an IP address of a vDU. In some examples, each carrier component can be assigned with at least one uplink (UL) frequency, at least one downlink (DL) frequency, and an absolute radio frequency channel number (ARFCN) identifying a radio frequency carrier in the network.

In some implementations, the device can be a radio unit (RU). In some examples, the connection request includes an IP address of the device.

According to another aspect of the subject matter described in this application, an element management system (EMS) configured to operate in a 5G Open Radio Access Network (O-RAN) can include at least one processor, and memory coupled to the at least one processor and storing instructions that, based on being executed by the at least one processor, perform operations. The operations can include receiving, from a device, a connection request for the device to establish communication with the network, the connection request including capability information pertaining to the device, transmitting, to a dynamic host configuration protocol (DHCP) server associated with the device, a request for an Internet Protocol (IP) address associated with the device, receiving, from the DHCP server in response to the request, an IP address of a cell site router (CSR) deployed between the device and the DHCP server such that communications between the device and the DHCP server are routed through the CSR, assigning, based at least in part on the capability information pertaining to the device, (i) one or more identifiers and (ii) a virtual distribution unit (vDU) associated with the 5G O-RAN, updating a database to link the device with the one or more identifiers, the IP address of the CSR, and the vDU that can support the device, the database storing information representing connections among network entities of the 5G O-RAN, and transmitting, to the device, an IP address of the vDU for the device to establish connection with the network.

Implementations according to this aspect can include one or more of the following features. For example, the one or more identifiers can include a cell identifier (cell ID) and a physical cell identifier (PCID), the cell ID being a specific identifier assigned to a cell in a remote site, and the PCID being a specific identifier indicating a physical layer identity of the cell.

In some implementations, the capability information can identify a carrier component supported by the device, and updating the database can include assigning the cell ID to a cell of the device based on the capability information. In some examples, one or more carrier components can be assigned with one or more cell IDs, and each cell ID can be assigned with a PCID, an IP address of a device, an IP address of a vDU. In some examples, each carrier component can be assigned with at least one uplink (UL) frequency, at least one downlink (DL) frequency, and an absolute radio frequency channel number (ARFCN) identifying a radio frequency carrier in the network.

In some implementations, the device can be a radio unit (RU). In some examples, the connection request includes an IP address of the device.

According to another aspect this document describes a non-transitory machine-readable storage device storing a program, wherein execution of the program causes one or more computers of an element management system (EMS) in a 5G Open Radio Access Network (O-RAN) to perform operations including: receiving, from a device, a connection request for the device to establish communication with the network, the connection request including capability information pertaining to the device, transmitting, to a dynamic host configuration protocol (DHCP) server associated with the device, a request for an Internet Protocol (IP) address associated with the device, receiving, from the DHCP server in response to the request, an IP address of a cell site router (CSR) deployed between the device and the DHCP server such that communications between the device and the DHCP server are routed through the CSR, assigning, based at least in part on the capability information pertaining to the device, (i) one or more identifiers and (ii) a virtual distribution unit (vDU) associated with the 5G O-RAN to the device, updating a database to link the device with the one or more identifiers and the IP address of the CSR, the database storing information representing connections among network entities of the 5G O-RAN, and transmitting, to the device, an IP address of the vDU for the device to establish connection with the network.

Implementations according to this aspect can include one or more of the following features. For example, the one or more identifiers can include a cell identifier (cell ID) and a physical cell identifier (PCID), the cell ID being a specific identifier assigned to a cell in a remote site, and the PCID being a specific identifier indicating a physical layer identity of the cell.

In some implementations, the capability information can identify a carrier component supported by the device, and updating the database can include assigning the cell ID to a cell of the device based on the capability information. In some examples, one or more carrier components can be assigned with one or more cell IDs, and each cell ID can be assigned with a PCID, an IP address of a device, an IP address of a vDU. In some implementations, each carrier component can be assigned with at least one uplink (UL) frequency, at least one downlink (DL) frequency, and an absolute radio frequency channel number (ARFCN) identifying a radio frequency carrier in the network.

In some implementations, the device can be a radio unit, and the connection request can include an IP address of the device.

BRIEF DESCRIPTION OF THE DRAWINGS

FIG. 4 is a flowchart showing an exemplary process for managing failure in communication establishment between a device and a vDU.

DETAILED DESCRIPTION

Figure 1:
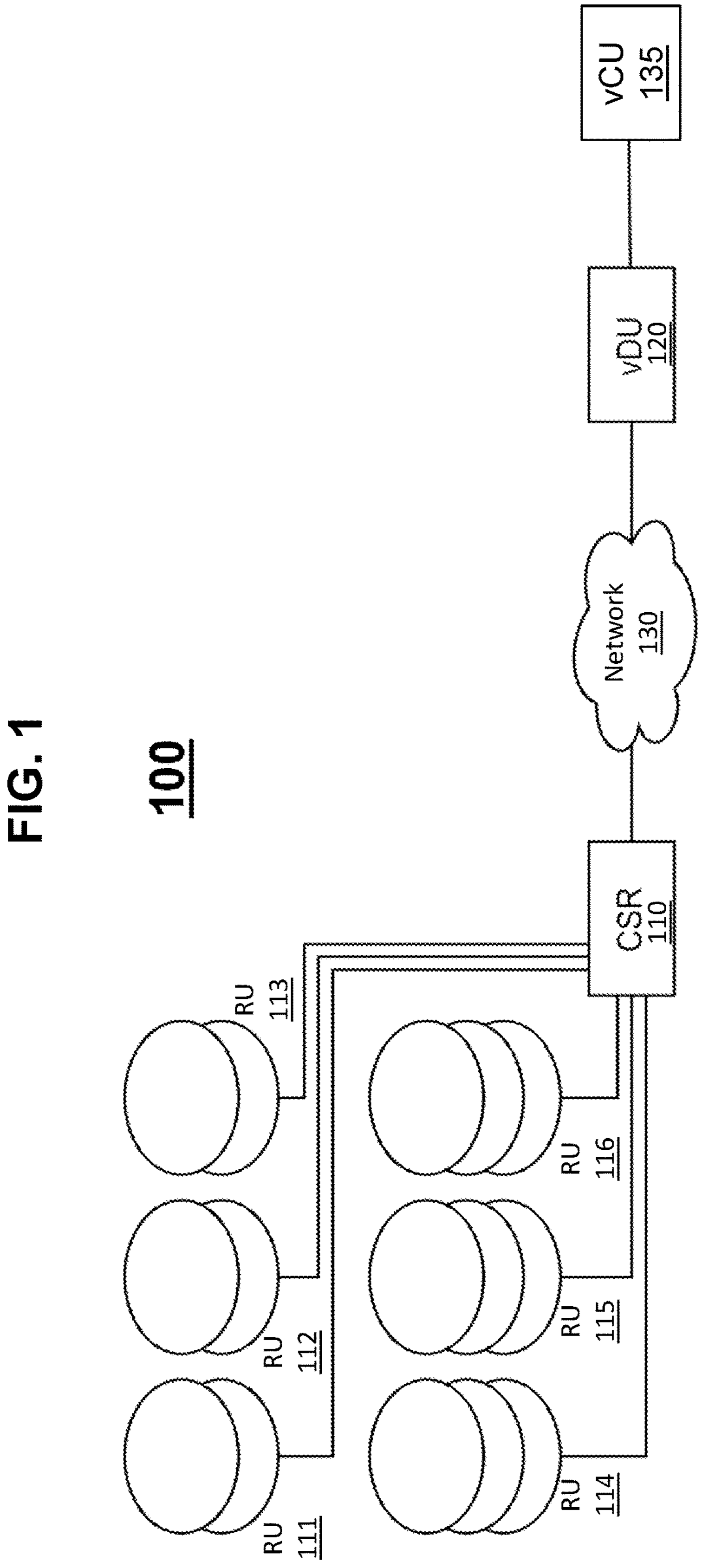
FIG. 1 is a diagram illustrating an example of an open radio access network (O-RAN).

A radio unit (RU) is a network element that handles various physical layer functionalities such as beamforming. As with other physical network elements in a 5G O-RAN, physical configurations for RUs are often mapped to the database of network elements manually during the RAN database setup. For example, prior to installing an RU at an onsite location, the physical RU is pre-associated with a corresponding logical network in the database—where the serial number or the MAC address of the RU is linked to cell IDs and virtual distribution units (vDUs) of the RAN. Consequently, in the installation process, it is necessary to retrieve the specific RU, potentially from a sizable batch of RUs stored in a warehouse.

In some cases, this can result in significantly longer delays, as compared to a situation where any readily available RU can be selected for installation. In certain cases, engineers may arrive at a site with an incorrect RU, necessitating either the retrieval of the accurate physical RU or reliance on a potentially time-consuming database update process prior to installation. A similar situation applies for a situation where a correctly-retrieved RU turns out to be defective.

For these reasons, a single missing or defective RU can cause significant delays in completing site installations, even if a spare RU is readily available. Furthermore, in the event of RU failures, a replacement cannot be seamlessly deployed until the database is updated. In certain scenarios, updating the database may involve additional personnel, resulting in associated logistical delays. This could potentially extend service interruption times and restrict the on-site technician's ability to independently address the issue.

The present disclosure is directed to address the above-referenced issues by avoiding the above-noted pre-configuration of RUs, but instead allowing RUs to be associated with the RAN database after the physical installation process. RUs can be automatically connected to a vDU that manages the area where the RU is located based on a corresponding cell site router (CSR) through which a message was relayed from the RU to a DHCP server. The IP address, once assigned to a CSR, remains unchanged even if the CSR is rebooted or even if the hardware associated with the CSR is replaced. The present disclosure allows an EMS to associate RUs with the logical network post-installation by communicating through the corresponding CSR. For example, because the location of the CSR is known, the location of the RU can be uniquely identified based on the IP address of the RU being found to be assigned via the CSR. By allowing an RU to be associated with the logical network based on the IP address of the corresponding CSR rather than the serial number of the RU, the mapping of the RU to the logical network can be postponed until the RU is physically installed at a site. This in turn can allow for any random RU to be physically deployed at a cell site, thereby alleviating the inefficiencies and delays associated with retrieving and installing particular RUs preconfigured for particular physical locations. In some implementations, the concepts described herein can be utilized for other network elements such as DUs and CUs.

FIG. 1 is a diagram illustrating an example of an open radio access network (O-RAN) 100. Referring to FIG. 1, the O-RAN 100 can include a plurality of radio unit (RUs) 111-116, a cell site router (CSR) 110, a virtual distribution unit (vDU) 120, a networking infrastructure 130, and a virtual central unit (vCU) 135.

The RU 111 (as well as other RUs 112-116) can transmit and receive a radio signal in the RAN. The RU 111 can convert digital signals into analog radio signals that are transmitted to and from user devices. In some implementations, the RU 111 can be implemented at cell sites, such as cell towers or small cells, where they connect to antennas to facilitate wireless communication with user devices.

The RU 111 in the O-RAN can be configured to support open interfaces, allowing interoperability between equipment from different vendors. In some implementations, the RU 111 can support multiple radio access technologies (RATs) and frequency bands, contributing to the scalability and adaptability of the 5G network.

In some implementations, the RUs 111-113 can be a dual-band RU that can support dual bands. In this context, “dual-band” may refer to a single RU supporting multiple cells, where such information is included in capability information of the RU. For example, when an element management system (EMS), which is described below in detail, receives the capability information from the RU, the EMS can determine which vDU can support the RU.

In some implementations, the RUs 114-116 can be a tri-band RU that can support tri-bands. In this context, each band can represent either a single cell or multiple cells, depending on whether the band comprises multiple carrier components.

The CSR 110 can manage communication between the RU and the vDU. For example, the CSR 110 can relay data transmitted from the plurality of RUs 111-116 to the vDU 120 through the networking infrastructure 130. The CSR 110 can handle data forwarding, routing, and other networking functions. The CSR 110 can connect the RUs 111-116 at the cell site to the vDU 120, facilitating the transfer of user data and control signals. The CSR can support standard networking protocols, such as IP (Internet Protocol), and ensure the efficient and secure flow of data between the cell site and the vDU.

The IP address, once assigned to the CSR 110, remains unchanged even if the CSR is rebooted or even if the hardware associated with the CSR 110 is replaced. Thus, the IP address of the CSR 110 can be used as an indicator of a specific location in the O-RAN 100. In some implementations, the CSR can be located in every site where the RUs are installed.

A cell site can be divided into three sectors, Alpha, Beta, and Gamma. These sectors can refer to different directional coverage areas within the cell site, each covering a portion of the total area. In some implementations, these sectors can be randomly selected such that the assignment of these names to the sectors is not based on a predetermined or systematic approach but can be done in a random manner.

A cell ID (Cell Identity) and a PCID (Physical Cell ID) can refer to identifiers associated with each cell. The cell ID can uniquely identify a cell within the network, while the PCID can be used to differentiate between cells in the area. In some implementations, the arrangement of the cell ID and the PCID can be done randomly among the three sectors belonging to the same site, where this random arrangement can ensure that neighboring sectors have distinct identifiers.

The use of random selection for sector names (alpha, beta, gamma) and the random arrangement of cell ID and PCID among sectors within the same site can contribute to a flexible and varied naming and identification scheme. This randomness can be advantageous in scenarios where predictability or specific patterns are not necessary, providing a degree of flexibility in network planning and management.

The vDU 120 may refer to a virtualized component of the distributed unit in the 5G network architecture. The vDU 120 can process user plane data, including functions related to radio resource management and data forwarding. In some implementations, the vDU 120 can be interconnected with the radio units 111-116 and the vCU 135, forming a distributed and virtualized network architecture that enhances resource utilization and network efficiency.

In some implementations, the connection between the CSR 110 and the vDU 120 can be established over the network infrastructure 130. For example, the connection can be based on protocols such as Ethernet.

The vCU 135 may refer to a virtual central unit that can process and manage radio resources. Some of the key operations performed by the vCU 135 can include radio resource management, signal processing, coordination with the vDU 120, and supporting network slicing.

Figure 2:
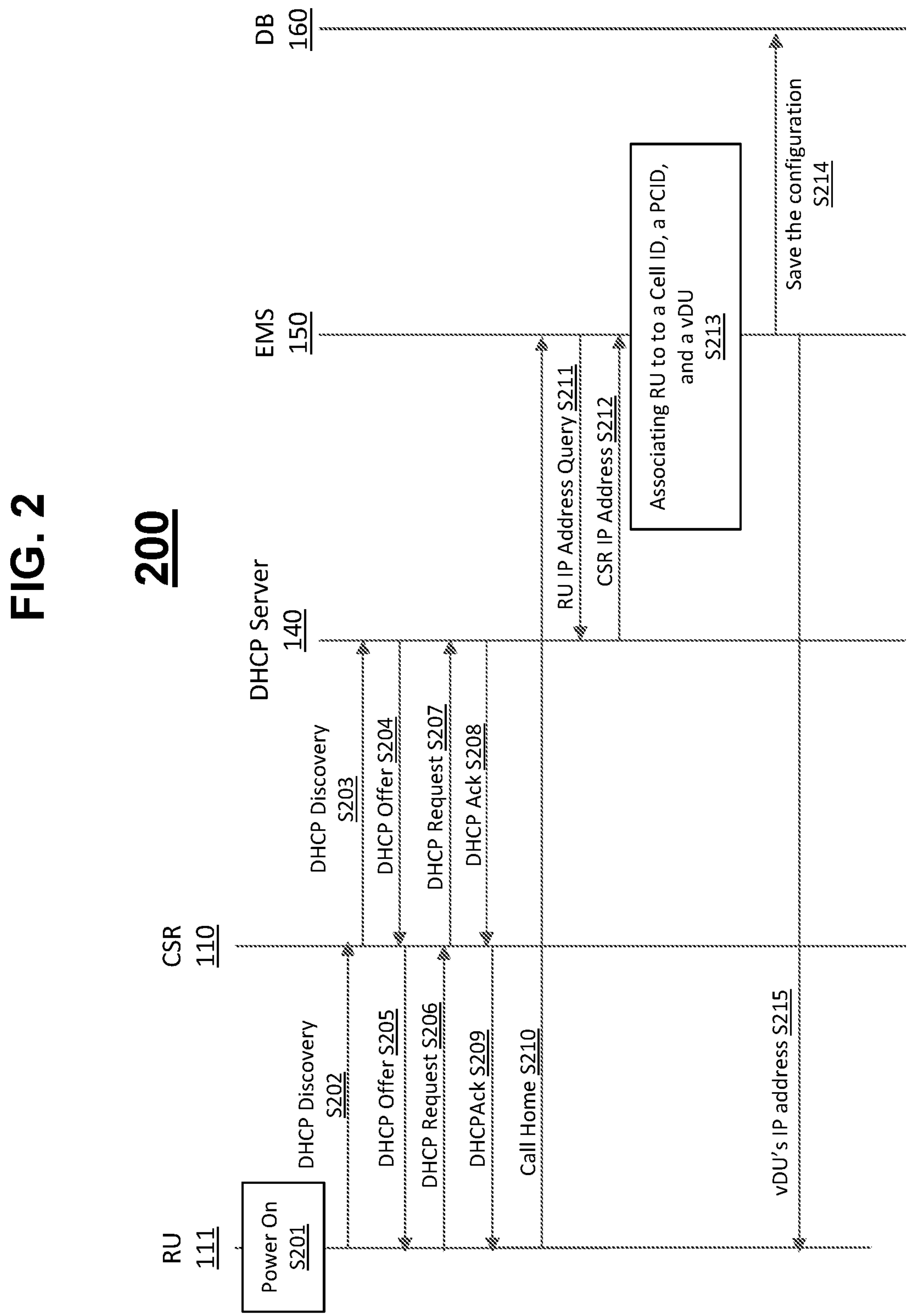
FIG. 2 is a diagram illustrating an example of operations for establishing communications between a device and a vDU.

FIG. 2 is a diagram illustrating an example of operations for establishing communications between a device (e.g., the RU 111) and a vDU 120.

In step S201, the RU can be installed at a site and powered on. At this initial state, the RU does not have a preconfigured IP address such that the RU needs to obtain an IP address.

In step S202, the RU can initiate a dynamic host configuration protocol (DHCP) process by sending a DHCP Discovery message. This message is broadcasted to the network 100, seeking a DHCP server 140.

The CSR 110, acting as a router and DHCP relay agent, can intercept the broadcasted DHCP Discovery message from the RU and, in step S203, can forward the DHCP Discovery message to the DHCP server 140.

The DHCP server 140 can receive the DHCP Discovery message and process the request by identifying available IP addresses.

In step S204, the DHCP server 140 can respond to the CSR 110 with a DHCP Offer message, which includes details such as the suggested IP address for the RU and other configuration parameters.

In step S205, the CSR 110 can forward the DHCP Offer to the RU 111, and the RU 111 can receive the offer and consider the suggested IP address.

In some implementations, the RU 111, having received one or more DHCP Offer messages, can select an offered IP address. In step S206, the RU 111 can transmit a DHCP Request message, broadcasting its request for the selected IP address.

In step S207, the CSR 110 can intercept the DHCP request message and forward the DHCP Request message to the DHCP server 140, indicating that the RU has accepted the offered IP address.

In step S208, the DHCP server 140 can receive the DHCP Request and acknowledge it by sending a DHCP Acknowledgment (ACK) message to the CSR 110.

In step S209, the CSR 110 can receive the DHCP ACK and forward the DHCP ACK to the RU 111.

The RU 111 can receive the DHCP Acknowledgment, and, in step S210, can transmit a connection request to an element management system (EMS) 150 to establish communication with the network. In some implementations, the connection request can include capability information pertaining to the device, which identifies a carrier component supported by the device. In some implementations, the connection request can include at least one of an IP address of the RU 111 or capability information regarding the bands, carrier components, etc.

The EMS 150 can manage and monitor individual network elements within the network 100. The EMS 150 can provide a centralized platform for configuring, monitoring, and maintaining these individual elements.

In step S211, the EMS 150 can transmit, to the DHCP server 140 associated with the RU 111, a request for an Internet Protocol (IP) address associated with the RU 111. In some implementations, the request can include RU's IP address.

In step S212, the DHCP server can, in response to the request received in step S211, transmit an IP address of the CSR 110, which is deployed between the RU 111 and the DHCP server 140 such that communications between the device and the DHCP server are routed through the CSR.

The DHCP server can identify the IP address of the CSR 110 by referring to a table that specifies which IP addresses are assigned to specific CSRs.

In step S213, the EMS 150 can assign, based at least in part on the capability information pertaining to the RU 111, (i) one or more identifiers and (ii) a vDU 120 associated with the 5G O-RAN 100.

In some implementations, the logical network encompassing the virtual representation of vDUs, cell IDs, and PCIDs within the 5G network can be built in a database 160 when the RU 111 is implemented at the site. For example, the logical network can include information regarding a site, a number of sectors at the site, one or more CSRs implemented in the site, a location of each of the one or more CSRs, and one or more cell IDs, PCIDs, and vDUs associated to the site. In some implementations, a number of cell IDs can correspond to a number of sectors.

Using this logical network, the EMS can associate the RU 111 to the cell IDs, the PCIDs, and a vDU.

For example, the one or more identifiers include a cell identifier (cell ID) and a physical cell identifier (PCID), where the cell ID is a specific identifier assigned to a cell within in a remote site, and the PCID is a specific identifier indicating a physical layer identity of the cell, as described above with respect to FIG. 1. In some implementations, the cell ID can be assigned to a cell of the RU 111.

The EMS 150 can also associate the vDU 120 that is connected to the CSR 110. As the vDU is created, information regarding a list of remote sites that the vDU should cover and a list of RUs in each site is available. Through the operations discussed above, when the EMS receives a connection request from the RU 111 in step S210, the EMS 150 asks the DHCP server 140 which CSR is involved in assigning the IP address to the RU. The knowledge of the CSR can enable the EMS to select a vDU that will serve the RU 111.

In step S214, the EMS 150 can save the configuration related to the assignment made in step S213 in the database 160 to update the logical network. For example, based on the capability information identifying a specific carrier component supported by the RU 111, the logical network in the database is updated by assigning the cell ID associated with the specific carrier component to a cell of the RU 111.

In some implementations, one or more carrier components in the site can be assigned with one or more cell IDs where each cell ID can be assigned with a PCID, an IP address of a RU, an IP address of a vDU. For example, the EMS 150 can update the logical network by assigning the IP address of the RU 111 for the cell ID that is associated with the carrier component supported by the RU, as indicated in the capability information.

In some implementations, each carrier component is assigned with at least one uplink (UL) frequency, at least one downlink (DL) frequency, and an absolute radio frequency channel number (ARFCN) identifying a radio frequency carrier in the network 100.

In step S215, the EMS 150 can transmit, to the RU 111, an IP address of the vDU 120 for the RU 111 to establish connection with the vDU 120.

Figure 3:
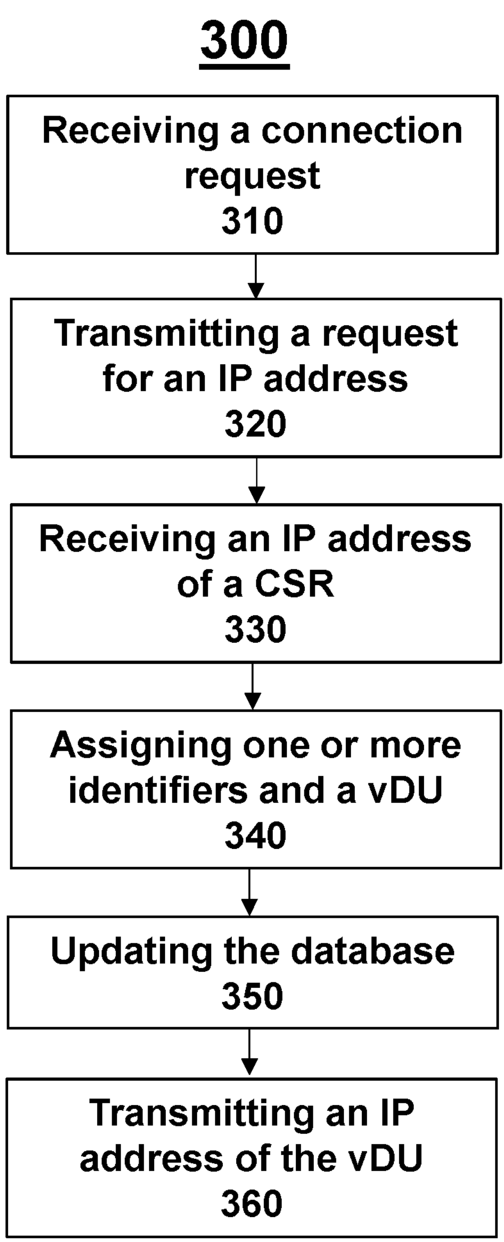
FIG. 3 is a flowchart showing an exemplary process for establishing communications between a device and a vDU.

FIG. 3 is a flowchart showing an exemplary process 300 for establishing communications between a device and a vDU.

In step S310, the EMS 150 can receive a connection request from the RU 111 to establish communication with the network 100. In some implementations, the connection request can include capability information pertaining to the device, which identifies a carrier component supported by the device.

In step S320, the EMS 150 can transmit, to the DHCP server 140 associated with the RU 111, a request for an Internet Protocol (IP) address of a CSR associated with the RU 111.

In step S330, the EMS 150 can receive, in response to the request sent in step S320, an IP address of the CSR 110, which is deployed between the RU 111 and the DHCP server 140 such that communications between the device and the DHCP server are routed through the CSR.

In step S340, the EMS 150 can assign, based at least in part on the capability information pertaining to the RU 111, (i) one or more identifiers and (ii) a vDU 120 associated with the 5G O-RAN 100.

In some implementations, the logical network encompassing the virtual representation of vDUs, cell IDs, and PCIDs within the 5G network can be built in a database 160 when the RU 111 is implemented at the site. For example, the logical network can include information regarding a site, a number of sectors at the site, one or more CSRs implemented in the site, a location of each of the one or more CSRs, and one or more cell IDs, PCIDs, and vDUs associated to the site.

Using this logical network, the EMS can associate the RU 111 to the cell IDs, the PCIDs, and a vDU.

For example, the one or more identifiers include a cell identifier (cell ID) and a physical cell identifier (PCID), where the cell ID is a specific identifier assigned to a cell within in a remote site associated with the CSR, and the PCID is a specific identifier indicating a physical layer identity of the cell, as described above with respect to FIG. 1. In some implementations, the cell ID can be assigned to a cell of the RU 111.

The EMS 150 can also associate the vDU 120 that is connected to the CSR 110. As the vDU is created, information regarding a list of remote sites that the vDU should cover and a list of RUs in each site is available. Through the operations discussed above, when the EMS receives a connection request from the RU 111 in step S310, the EMS 150 asks the DHCP server 140 which CSR is involved in assigning the IP address to the RU. The knowledge of the CSR can enable the EMS to select a vDU that will serve the RU 111.

In step S350, the EMS 150 can save the configuration related to the assignment made in step S340 in the database 160 to update the logical network. For example, based on the capability information identifying a specific carrier component supported by the RU 111, the logical network in the database is updated by assigning the cell ID associated with the specific carrier component to a cell of the RU 111.

In some implementations, one or more carrier components in the site can be assigned with one or more cell IDs where each cell ID can be assigned with a PCID, an IP address of a RU, an IP address of a vDU. For example, the EMS 150 can update the logical network by assigning the IP address of the RU 111 for the cell ID that is associated with the carrier component supported by the RU, as indicated in the capability information.

In some implementations, each carrier component is assigned with at least one uplink (UL) frequency, at least one downlink (DL) frequency, and an absolute radio frequency channel number (ARFCN) identifying a radio frequency carrier in the network 100.

In step S360, the EMS 150 can transmit, to the RU 111, an IP address of the vDU 120 for the RU 111 to establish connection with the vDU 120.

Figure 4:
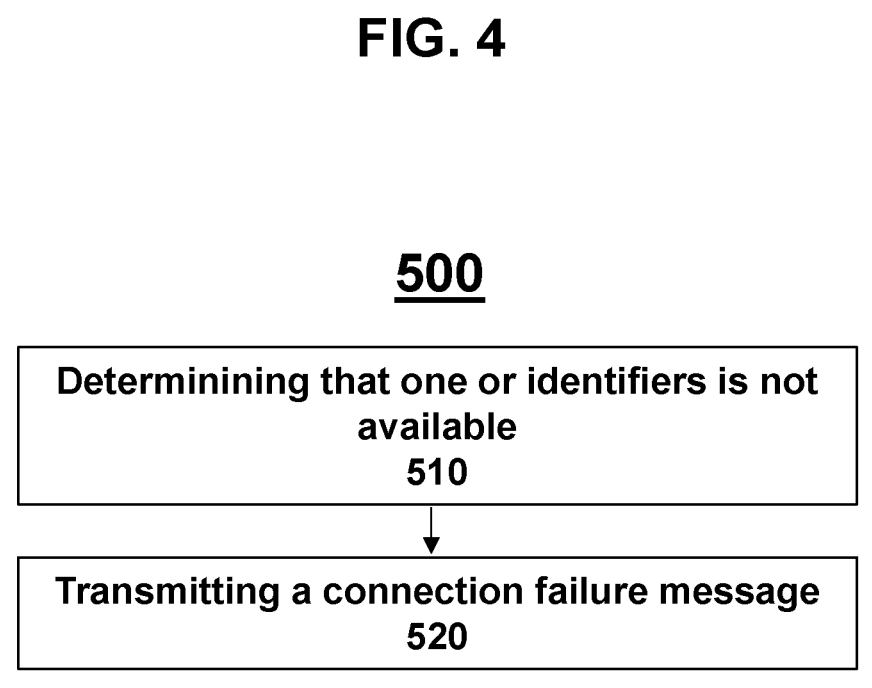

FIG. 4 is a flowchart showing an exemplary process 400 for managing failure in communication establishment between a device and a vDU.

In step S510, the EMS 150 can determine that a unique combination of the one or more identifiers is not available for assignment to the RU 111. For example, if all cell IDs are assigned, the EMS 150 can determine that the RU 111 cannot be connected to the vDU 120.

In step S520, the EMS 150 can transmit a connection failure message to the RU 111 based on a determination in step S510 that the unique combination of the one or more identifiers is not available for assignment to the RU 111.

Figure 5:
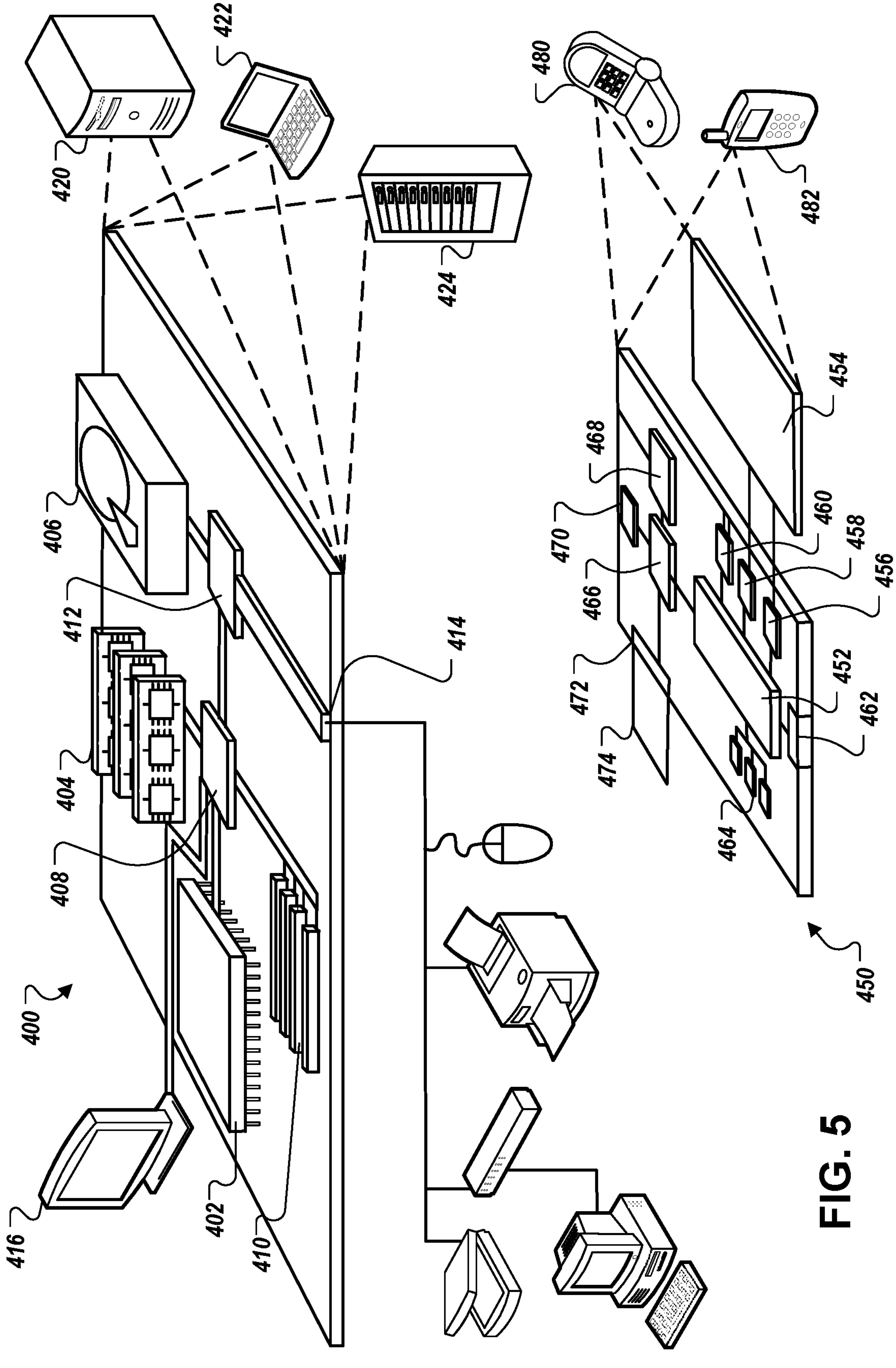
FIG. 5 is a diagram illustrating a computing system that can be used in connection with computer-implemented methods described in this specification.

FIG. 5 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 400 and/or the mobile computing device 450 can form at least a portion of the application installation environment described above.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 406. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 5. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other. The computing device 400 may be implemented in the RUs 111-116, the CSR 110, the vDU 120, the network infrastructure 130, the DHCP server 140, the EMS 150, and the database 160, described with respect to FIGS. 1-4.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC)

processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 5. For example, it may be implemented in the RUs 111-116, a DU, and a CU described with respect to FIGS. 1-4. Other implementations may include a phone device 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

Although a few implementations have been described in detail above, other modifications may be made without departing from the scope of the inventive concepts described herein, and, accordingly, other implementations are within the scope of the following claims.

What is claimed is:

1. A method for establishing communications between a device and a 5G Open Radio Access Network (O-RAN), the method comprising:

receiving, at an element management system (EMS) from the device, a connection request for the device to establish communication with a 5G O-RAN network, the connection request including capability information pertaining to the device;

transmitting, by the EMS to a dynamic host configuration protocol (DHCP) server associated with the device, a request for an Internet Protocol (IP) address associated with the device;

receiving, at the EMS from the DHCP server in response to the request, an IP address of a cell site router (CSR) deployed between the device and the DHCP server such that communications between the device and the DHCP server are routed through the CSR;

assigning, to the device by the EMS based at least in part on the capability information pertaining to the device, (i) one or more identifiers and (ii) a virtual distribution unit (vDU) associated with the 5G O-RAN;

updating, by the EMS, a database to link the device with the one or more identifiers and the IP address of the CSR, the database storing information representing connections among network entities of the 5G O-RAN; and transmitting, from the EMS to the device, an IP address of the vDU for the device to establish connection with the 5G O-RAN.

2. The method of claim 1, wherein the one or more identifiers include a cell identifier (cell ID) and a physical cell identifier (PCID), the cell ID being a specific identifier assigned to a cell in a remote site, and the PCID being a specific identifier indicating a physical layer identity of the cell.

3. The method of claim 2, wherein the capability information identifies a carrier component supported by the device, and wherein updating the database comprises assigning the cell ID to a cell of the device based on and the capability information.

4. The method of claim 3, wherein one or more carrier components are assigned with one or more cell IDs, and wherein each cell ID is assigned with a PCID, an IP address of the device, and an IP address of the vDU.

5. The method of claim 4, wherein each carrier component is assigned with at least one uplink (UL) frequency, at least one downlink (DL) frequency, and an absolute radio frequency channel number (ARFCN) identifying a radio frequency carrier in the 5G O-RAN.

6. The method of claim 1, wherein the device is a radio unit.

7. The method of claim 1, wherein the connection request includes an IP address of the device.

8. An element management system (EMS) configured to operate in a 5G Open Radio Access Network (O-RAN), the system comprising:

at least one processor; and memory coupled to the at least one processor and storing instructions that, based on being executed by the at least one processor, perform operations comprising:

receiving, from a device, a connection request for the device to establish communication with the a 5G O-RAN network, the connection request including capability information pertaining to the device;

transmitting, to a dynamic host configuration protocol (DHCP) server associated with the device, a request for an Internet Protocol (IP) address associated with the device;

receiving, from the DHCP server in response to the request, an IP address of a cell site router (CSR) deployed between the device and the DHCP server such that communications between the device and the DHCP server are routed through the CSR;

assigning, based at least in part on the capability information pertaining to the device, (i) one or more identifiers and (ii) a virtual distribution unit (vDU) associated with the 5G O-RAN to the device;

updating a database to link the device with the one or more identifiers and the IP address of the CSR, the database storing information representing connections among network entities of the 5G O-RAN;

transmitting, to the device, an IP address of the vDU for the device to establish connection with the 5G O-RAN.

9. The system of claim 8, wherein the one or more identifiers include a cell identifier (cell ID) and a physical cell identifier (PCID), the cell ID being a specific identifier assigned to a cell in a remote site, and the PCID being a specific identifier indicating a physical layer identity of the cell.

10. The system of claim 9, wherein the capability information identifies a carrier component supported by the device, and wherein updating the database comprises assigning the cell ID to a cell of the device based on the capability information.

11. The system of claim 10, wherein one or more carrier components are assigned with one or more cell IDs, and wherein each cell ID is assigned with a PCID, an IP address of the device, and an IP address of the vDU.

12. The system of claim 11, wherein each carrier component is assigned with at least one uplink (UL) frequency, at least one downlink (DL) frequency, and an absolute radio frequency channel number (ARFCN) identifying a radio frequency carrier in the 5G O-RAN.

13. The system of claim 8, wherein the device is a radio unit.

14. The system of claim 8, wherein the connection request includes an IP address of the device.

15. A non-transitory machine-readable storage device storing a program, which upon execution causes one or more computers of an element management system (EMS) in a 5G Open Radio Access Network (O-RAN) to perform operations comprising:

receiving, from a device, a connection request for the device to establish communication with a 5G O-RAN network, the connection request including capability information pertaining to the device;

transmitting, to a dynamic host configuration protocol (DHCP) server associated with the device, a request for an Internet Protocol (IP) address associated with the device;

receiving, from the DHCP server in response to the request, an IP address of a cell site router (CSR) deployed between the device and the DHCP server such that communications between the device and the DHCP server are routed through the CSR;

assigning, based at least in part on the capability information pertaining to the device, (i) one or more identifiers and (ii) a virtual distribution unit (vDU) associated with the 5G O-RAN to the device;

updating a database to link the device with the one or more identifiers and the IP address of the CSR, the database storing information representing connections among network entities of the 5G O-RAN; and transmitting, to the device, an IP address of the vDU for the device to establish connection with the 5G O-RAN.

16. The non-transitory machine-readable storage device of claim 15, wherein the one or more identifiers include a cell identifier (cell ID) and a physical cell identifier (PCID), the cell ID being a specific identifier assigned to a cell in a remote site, and the PCID being a specific identifier indicating a physical layer identity of the cell.

17. The non-transitory machine-readable storage device of claim 16, wherein the capability information identifies a carrier component supported by the device, and wherein updating the database comprises assigning the cell ID to a cell of the device based on the capability information.

18. The non-transitory machine-readable storage device of claim 17, wherein one or more carrier components are assigned with one or more cell IDs, and wherein each cell ID is assigned with a PCID, an IP address of the device, and an IP address of the vDU.

19. The non-transitory machine-readable storage device of claim 18, wherein each carrier component is assigned with at least one uplink (UL) frequency, at least one downlink (DL) frequency, and an absolute radio frequency channel number (ARFCN) identifying a radio frequency carrier in the 5G O-RAN.

20. The non-transitory machine-readable storage device of claim 15, wherein the device is a radio unit, and wherein the connection request includes an IP address of the device.

* * * * *